INVENTOR.
BENJAMIN LIEBOWITZ
BY
Michael S. Striker
—Agt.

Nov. 19, 1957 B. LIEBOWITZ 2,813,326

TRANSISTORS

Filed Aug. 20, 1953 3 Sheets-Sheet 2

INVENTOR.

BENJAMIN LIEBOWITZ

BY

Michael S. Striker

Agt.

Nov. 19, 1957 B. LIEBOWITZ 2,813,326
TRANSISTORS
Filed Aug. 20, 1953 3 Sheets-Sheet 3
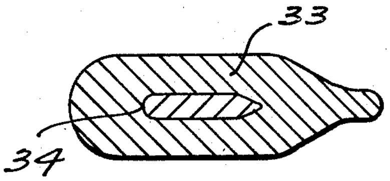
FIG. 10.
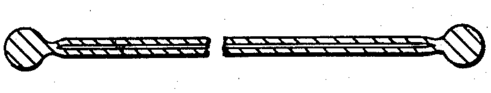
FIG. 11.
FIG. 12.
FIG. 13.
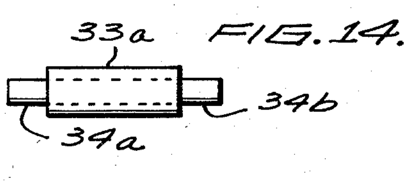
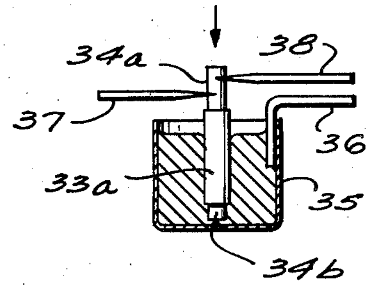
FIG. 15.
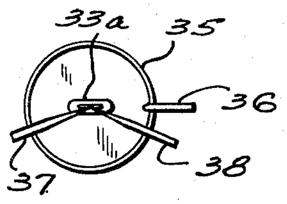
FIG. 16.
INVENTOR.
BENJAMIN LIEBOWITZ
BY
Michael S. Striker
Agt.

United States Patent Office 2,813,326

Patented Nov. 19, 1957

2,813,326

TRANSISTORS

Benjamin Liebowitz, Lewisboro, N. Y.

Application August 20, 1953, Serial No. 375,397

5 Claims. (Cl. 29—25.3)

This invention relates to transistors and has for its first purpose the preparation of semiconductor material for transistors with the requisite concentration of alloying materials, its second purpose the spreading of the use of a small amount of the semiconductor material thus prepared over a large number of transistors, and has for its third purpose the construction and design of transistors embodying very small amounts of semiconductor material thus prepared.

I shall restrict my description to germanium which is the element most commonly used in transistors today. I shall refer, as is customary in the literature, to p-type and n-type material, but make no reference to the specific alloying element which is used for the purpose of preparing the p-type and the n-type.

The meanings of these terms are well understood in the art and the materials to be used in the preparation are also well understood in the art.

My invention will be understood by reference to the accompanying drawings in which:

Fig. 10 is a cross-section through a quartz or quartz-like jacket having a germanium bead inside it, said germanium bead containing the requisite amount of impurities of the desired kind;

Fig. 11 is a longitudinal cross-section through the composite piece of Fig. 10 after it has been drawn to the desired cross-sectional dimensions;

Fig. 12 is a transverse cross-section through Fig. 11;

Fig. 13 is a cross-section through Fig. 11 after the same has been flattened;

Fig. 14 is a plan view of a segment taken from the elongated material whose cross-section is shown in Fig. 14, with the germanium core bared at the ends;

Fig. 15 is a cross-sectional view of a completed transistor made with the segment of Fig. 14;

Fig. 16 is a plan view of the transistor shown in cross-section in Fig. 15.

All these figures are purely diagrammatic and are grossly exaggerated as to dimensions which, moreover, are not to scale.

Figures 1, 2, 3, 4, 5:
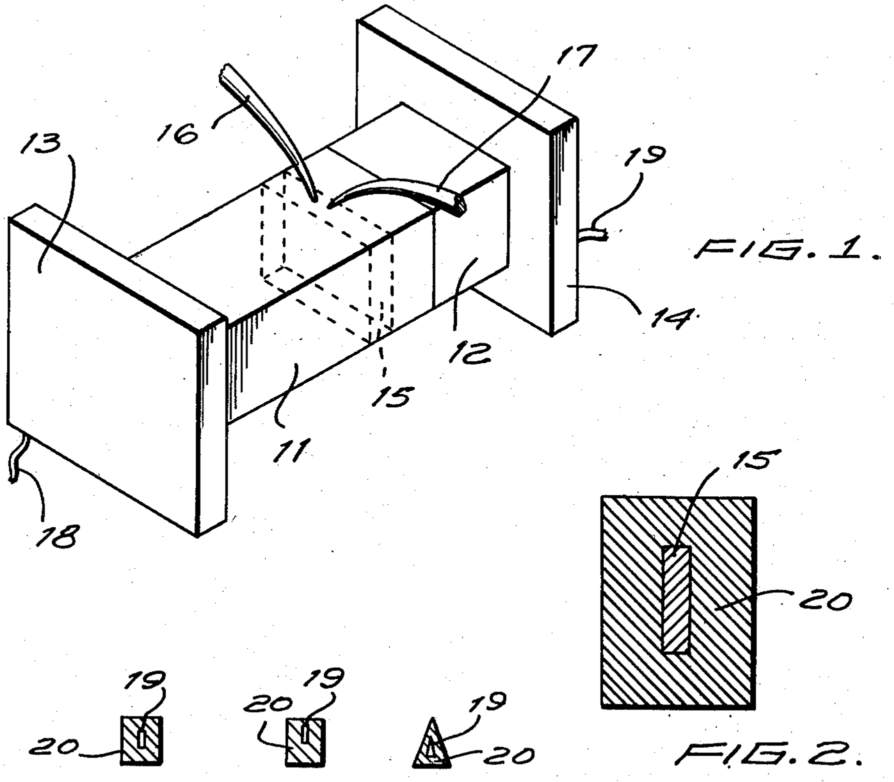
Fig. 1 is an assembly of a germanium member and an alloying member designed to produce p-type or n-type material by a diffusion process.
Fig. 2 is a cross-section of a piece of material thus produced encased in a jacket of metal.
Fig. 3 is a cross-section corresponding to Fig. 2 after the composite piece has been rolled and/or drawn to the requisite cross-sectional dimensions.
Fig. 4 is a modification of Fig. 3.
Fig. 5 is another modification.

In Fig. 1 is shown an assembly of a block of germanium 11 which is in itimate contact with a block of alloying element 12. Each block in turn may be placed in contact with a heavy metal block as shown at 13 and 14. The assembly is heated so as to cause diffusion from the alloying block 12 into the germanium block 11. According to well-known laws of diffusion the concentration of the alloying element in the germanium will be largest at the junction between the two blocks and will fall off rapidly at first as one goes from the alloying block along the germanium block. In due course at some one region shown by the dotted rectangular parallelepiped 15 there will be a region which has the desired concentration of impurities. By choosing this region sufficiently short along the length of the block, the variation in concentration within it will be sufficiently small so that the concentration in said portion 15 may be regarded as sufficiently uniform for practical purposes. To test the concentration and to assist in finding the region where the concentration is suitable, electrodes 16 and 17 may be applied so as to determine the conductivity and rectifying properties in various regions.

Electric currents may be passed through the assembly by means of the leads 18 and 19 to assist the diffusion process.

When, in this way or any other known way a region 15 is obtained having the desired concentration of impurities for either a p-type or an n-type as the case may be, it is cut out from the block completely. It will of course be a relatively small piece of germanium but by the processes to be described it can be extended so as to produce a substantial number of transistors.

This spreading of a small amount of germanium having the proper concentration of impurities over a substantial number of transistors is achieved by encasing the small portion 15 in a metallic block 20 (see Fig. 2) and then rolling and/or drawing the assembly down. This is essentially the process by means of which so-called Wollaston wires are made. Final rolled and/or drawn section is diagrammatically illustrated in Fig. 3. However, many modifications can be made. For instance, the germanium portion 19 may lie eccentrically in the final cross-section as shown in Fig. 4. Or the whole cross-section may be wedge-shaped whereby a wedge-shaped cross-section is formed in the germanium core 19 as shown in Fig. 5.

In the rolling and/or drawing process as little heat as possible should be used so as to minimize contamination of the germanium by the encasing metal. Furthermore the encasing metal should be judiciously selected for the purpose of minimizing this contamination.

As to final dimensions, it is contemplated here to reduce the germanium core to a thickness of the order of magnitude of 0.001″ more or less, and the width of the said core to something like 0.035″ more or less.

When the rolling and/or drawing operation is complete the final "wire" is cut up into short lengths suitable for use in transistors, lengths of the order of ¼″ or ⅜″ more or less.

One end of the germanium core is then exposed by the application of a suitable solvent which will attack the jacketing metal but not the germanium. For example, if the jacketing metal is silver or copper then the material for removing it without affecting the germanium core may be, for example, nitric acid or sodium or potassium cyanide. The jacketing metal may be removed at one end only as shown in Fig. 6, or it may be removed in a central portion so as to expose only part of the germanium core.

Figure 8:
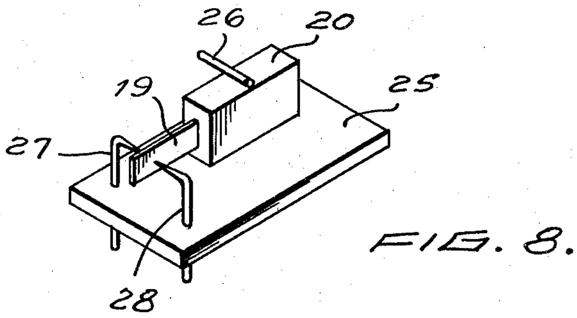
Fig. 8 is an isometric view of a completed transistor of the contact type.

Fig. 8 is an isometric view of a completed contact transistor consisting of a base 25 on which is mounted the jacketed germanium element 20 with the exposed germanium core at 19. Contact is made with the body of the germanium through the jacket 20 by the wire 26. Pointed electrodes 27 and 28 may be brought into contact with the exposed germanium end 19 on opposite sides of the germanium core. It is important to note that this can be done because of the thinness to which the germanium can be reduced by this procedure.

Figure 9:
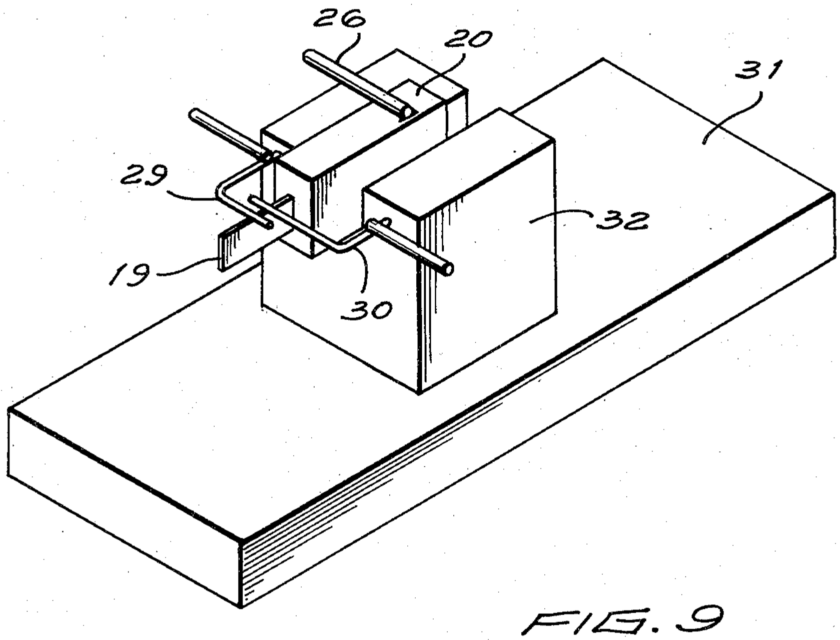
Fig. 9 is a modification of Fig. 8.

Fig. 9 is an isometric view of another form of transistor in which the contact to the germanium core is made at the edge by means of electrodes 29 and 30. Here we have a base 31 and an insulating mounting 32 in which the composite wire 20 is held with the germanium core exposed at one end again as shown at 19. The essential difference between the showing of Fig. 8 and Fig. 9 is the manner in which contact is made with the germanium.

Figure 6:
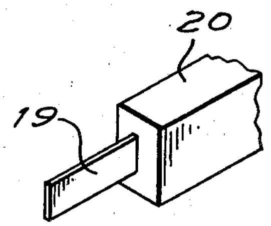
Fig. 6 is a fragmentary isometric view to a greatly enlarged scale showing a piece of the composite rolled and/or drawn material after the germanium core has been bared by the application of acid.
Figure 7:
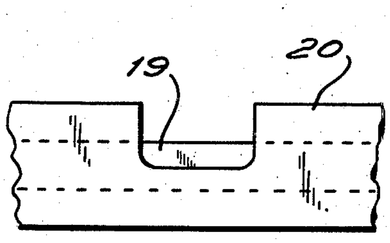
Fig. 7 is a modification of Fig. 6.

It will be obvious to those skilled in the art how the form shown in Fig. 7 may be used instead of the form shown in Fig. 6.

On account of the danger of contamination when using a metal-jacketed core of germanium, it may be of considerable advantage to use a quartz or glass-jacketed bead of germanium and draw it down. Fig. 10 shows a quartz or quartz-like jacket 33 inside of which is a germanium bead 34. The assembly is heated up to the point where the quartz or quartz-like substance is soft, at which point the germanium will be melted. Pyrex has been successfully used for this purpose in my first experiments. The assembly is then drawn down as shown in Fig. 11. It will have normally a circular section as shown in Fig. 12. It can be used in this manner or preferably the whole cross-section can be flattened by heating the composite "wire" again and then rolling to flatness as shown in Fig. 13. Short lengths are then cut from this "Taylor wire" and the germanium core bared at the ends as shown at **34*a* and *b*. This may be done by means of hydrofluoric acid, which attacks the quartz or quartz-like jacket, but provided due care is used. The short piece is then "potted" in a small pot 35 which is filled with molten metal; before filling, a wire is inserted as shown at 36. The molten metal after hardening makes contact between the bared germanium core 34*b* and the wire 36. The electrodes for the contact with the germanium may be applied to the exposed end 34*a* as shown at 37—38**.

To avoid the cumbersome expression "rolled and/or drawn" in the claims we shall use, instead, in may instances expressions "reduced," "reducing."

I claim:

1. In the process of manufacturing transistors which comprise a semi-conducting material having desired concentration of impurities for desired characteristics, in combination the steps of jacketing a piece of said semiconducting material in a jacket of other material to form a composite piece, reducing said composite piece until the semi-conducting core thereof has been reduced to the desired cross-sectional size and shape, cutting said reduced composite piece into short lengths, exposing a portion of the semi-conducting core of at least one of said short composite pieces by chemical treatment of the jacket, and finally making at least one contact on the exposed portion of said core for assembly in a transistor.

2. In the process of manufacturing transistors which comprise a semiconducting material having desired concentration of impurities for desired characteristics, in combination the steps of producing said desired concentration in a piece of semiconducting material by diffusion, jacketing said piece in a jacket of other material to form a composite piece, reducing the transverse dimensions and elongating the longitudinal dimension of said composite piece, e. g. by rolling until the semiconducting core thereof has been reduced to the desired cross-sectional size and shape, cutting said reduced composite piece into short lengths, exposing a portion of the semiconducting core of at least one of said short composite pieces by chemical treatment of the jacket, and finally making at least one contact on the exposed portion of said core for assembly in a transistor.

3. In a method of making junction transistors comprising semiconducting material having p-type characteristics in one portion thereof and n-type characteristics in an adjacent portion with a transition region between said portions from p-type to n-type, in combination the steps of encasing a piece of said semiconducting material in a jacket of other material so as to form a composite piece, reducing said composite piece, e. g. by rolling, so as to greatly increase the length of said transition region and correspondingly to reduce its transverse dimensions, cutting said reduced composite piece into short lengths, exposing by chemical action on the jacket at least one area of the semiconducting core of said composite piece so as to expose at least the reduced transition region in that area, and making electrical contact in said exposed area of said transition region for assembly in a junction transistor.

4. In the process of manufacturing transistors which comprise a semi-conducting material having desired concentration of impurities for desired characteristics, in combination the steps of jacketing a piece of said semi-conducting material in a jacket of other material to form a composite piece, reducing said composite piece until the semi-conducting core thereof has been reduced to the desired cross-sectional size and shape, exposing a portion of the semi-conducting core of said composite piece, and making at least one contact on the exposed portion of said core for assembly in a transistor.

5. In the process of manufacturing transistors which comprise a semi-conducting material having desired concentration of impurities for desired characteristics, in combination the steps of producing said desired concentration in a piece of semi-conducting material by diffusion, jacketing said piece in a jacket of other material to form a composite piece, reducing the transverse dimensions and elongating the longitudinal dimension of said composite piece, e. g. by drawing until the semi-conducting core thereof has been reduced to the desired cross-sectional size and shape, cutting said reduced composite piece into short lengths, exposing a portion of the semi-conducting core of at least one of said short composite pieces by chemical treatment of the jacket and finally making at least one contact on the exposed portion of said core for assembly in a transistor.

References Cited in the file of this patent

UNITED STATES PATENTS

| | | |
|---|---|---|
| 2,666,814 | Shockley | Jan. 19, 1954 |
| 2,672,528 | Shockley | Mar. 16, 1954 |